(12) United States Patent
Elliott

(10) Patent No.: US 7,126,290 B2
(45) Date of Patent: Oct. 24, 2006

(54) LIGHT DIMMER FOR LED AND INCANDESCENT LAMPS

(75) Inventor: Stephen Elliott, Brandenton, FL (US)

(73) Assignee: Radiant Power Corp., Sarasota, FL (US)

( * ) Notice: Subject to any disclaimer, the term of this patent is extended or adjusted under 35 U.S.C. 154(b) by 15 days.

(21) Appl. No.: 10/770,355

(22) Filed: Feb. 2, 2004

(65) Prior Publication Data

US 2005/0168168 A1    Aug. 4, 2005

(51) Int. Cl.
*H05B 37/02* (2006.01)

(52) U.S. Cl. ...................................... 315/312; 315/247

(58) Field of Classification Search ................ 315/149, 315/291, 312, 322, 362
See application file for complete search history.

(56) References Cited

U.S. PATENT DOCUMENTS

| | | | |
|---|---|---|---|
| 4,093,223 A * | 6/1978 | Wilke et al. ..................... 463/4 |
| 4,198,629 A * | 4/1980 | Marion ......................... 345/46 |
| 4,939,423 A | 7/1990 | Ruby |
| 5,036,253 A | 7/1991 | Nilssen |
| 5,144,202 A | 9/1992 | Nilssen |
| 5,212,427 A | 5/1993 | Jones |
| 5,430,356 A | 7/1995 | Ference et al. |
| 6,559,777 B1 | 5/2003 | Martin et al. |
| 6,577,080 B1 * | 6/2003 | Lys et al. ..................... 315/362 |
| 6,593,709 B1 | 7/2003 | Lee et al. |
| 6,608,453 B1 * | 8/2003 | Morgan et al. .............. 315/312 |
| 6,621,224 B1 * | 9/2003 | Umezawa et al. ............ 315/82 |
| 6,653,798 B1 | 11/2003 | Guthrie et al. |
| 6,664,735 B1 | 12/2003 | Kita et al. |
| 6,670,776 B1 | 12/2003 | Guthrie et al. |
| 6,677,710 B1 | 1/2004 | Weedon |
| 6,806,659 B1 * | 10/2004 | Mueller et al. .............. 315/295 |
| 2002/0195975 A1 * | 12/2002 | Schanberger et al. ....... 315/291 |
| 2003/0085660 A1 * | 5/2003 | Umezawa et al. ............ 315/77 |
| 2003/0222587 A1 * | 12/2003 | Dowling et al. ............ 315/149 |

FOREIGN PATENT DOCUMENTS

| | | |
|---|---|---|
| EP | 0 991 304 A2 | 5/2000 |
| WO | WO 03096761 | 11/2003 |

OTHER PUBLICATIONS

CAT32 CMOS White LED Driver, Catalyst Semiconductor Inc., pp. 1-16.
FAN5608 Serial/Parallel LED Driver with Current-Regulated, Step-Up, DC-to-DC Converter, Fairchild Semiconductor, pp. 1-18.
DEI1090 LED Driver with Square-Law Dimming Control, Device Engineering Inc., Preliminary, pp. 1-5.

* cited by examiner

*Primary Examiner*—Shih-Chao Chen
*Assistant Examiner*—Minh Dieu A
(74) *Attorney, Agent, or Firm*—Gerald E. Linden; Dwight A. Stauffer

(57) ABSTRACT

The light output intensity of incandescent lamps and LEDs connected to a common lamp power bus are controlled using a composite waveform having two power components: a pulse-width modulated (PWM) component and a direct current DC component. The DC component is maintained below the turn-on voltage for the LEDs. The PWM component controls the light intensity of the LEDs; and the DC component is calculated as a quadrature power series, taking into account that the PWM component contributes to the light intensity of the incandescent lamps. The frequency and slew rate of the PWM component are selected to minimize EMI. A small steady state power component is provided to keep the LEDs slightly turned on to minimize EMI.

25 Claims, 1 Drawing Sheet

LIGHT DIMMER FOR LED AND INCANDESCENT LAMPS

TECHNICAL FIELD OF THE INVENTION

The invention relates to light dimmers and, more particularly, to controlling the intensity of (dimming) incandescent lamps and light-emitting diodes (LEDs).

BACKGROUND OF THE INVENTION

Incandescent lamps (or bulbs, or light bulbs) operate differently than light emitting diodes (LEDs). (LEDs are also referred to as "LED lamps".) Basically, incandescent lamps are voltage driven devices, and LEDs are current driven devices. They therefore require different techniques for controlling (e.g., dimming) the intensity of their respective light outputs.

For an incandescent lamp the amount of light produced is more-or-less proportional to the cube of the applied voltage—more specifically, it is proportional to the $3.4^{th}$ power of the ratio of the RMS (Root-Mean-Square) voltages. (The RMS voltage is the square root of the mean value of the square of the instantaneous voltage.) That means, if the RMS voltage is reduced by one half ($\frac{1}{2}$), the light is reduced to $(\frac{1}{2})^{3.4}$ or about one-tenth ($\frac{1}{10}$). Or, an incandescen lamp operating at 20% of nominal voltage (e.g., a 5V lamp operated at 1V) will only produce $\frac{1}{280}$ of the light produced at nominal voltage.

In an alternating current (AC) system, such as household, adjusting the light output of an incandescent lamp lighting device is typically carried out by controlling a phase angle of an electrical power supplied to the incandescent lamp under application of a switching element such as a TRIAC switch. In a direct current (DC) system, such as instrument illumination, adjusting the light output of an incandescent lamp is typically carried out by lowering the voltage, as discussed in the previous paragraph.

LEDs are current driven devices. Fewer amps in means fewer photons out. But LEDs are not typically powered from a true current source. The vast majority of power supplies are voltage sources, and that is what is usually found powering LEDs. The relationship between current and voltage in an LED is non-linear. As the voltage increases from zero there is only a trickle of current and no noticeable light. At about a volt and three-quarters (e.g., for red LEDs) the current begins to increase appreciably and the first glimmer of light appears. At two volts (2V) the LED is bright and with only a little more voltage it becomes very bright. Once over about 2.2 volts, the current rapidly soars beyond safe operation. Generally speaking, powering LEDs directly from a voltage source is not such a good idea. The usual approach is to connect a resistor in series with the LED. The combination is still non-linear, but in a much more well behaved manner. In fact, over the range of safe operating current, it acts incrementally linear. And, of course, series resistors represent power losses.

It takes 2 to 4 V to light an LED, depending on its color. Red LEDs take about 2 V, green and yellow LEDs take about 2.4 V, blue LEDs take 3 V, and white LEDs take about 4 V to illuminate. For white LEDs operating normally, a voltage of at least approximately 3.5 volts is required. These voltages are referred to as "turn-on" (or "threshold") voltages. For a given type of device, run in different batches, the threshold voltages may vary by several percent (e.g., +/−10%) from rated threshold.

A typical technique for dimming LEDs is to use Pulse Width Modulation (PWM). Pulse Width Modulation is a technique of voltage regulation. In PWM, the output is at an essentially fixed voltage level, and it is turned on-and-off at a high rate. In this manner, an average output voltage is equal to the duty cycle "D" (the percentage of time that the output is on) times the input voltage. A typical frequency of the output on-and-off would be 400 Hz. The duty cycle D can be varied from 0% (resulting in 0 volts average output voltage) all the way to 100% (average output voltage=input voltage). The light produced by LEDs is proportional to the average current in the LEDs. Applying a 50% duty cycle PWM signal to an LED will produce ½ of the light that the LED produces when 100% duty cycle is applied.

Many existing integrated circuits perform LED dimming. These operate in either PWM mode if the input voltage is higher than the LED voltage, or they operate in current-source mode if the input voltage is lower (like battery operated equipment). Some current source devices can be PWM'ed to vary intensity as well. Typical examples of current source devices are the CAT32 CMOS White LED Driver (Catalyst Semiconductor Inc.) and the FAN5608 Series/Parallel LED Driver with Current-Regulated, Step-Up DC/DC Converter (Fairchild Semiconductor).

Like many other display systems, aircraft instrumentation displays frequently employ illuminated indicators. Originally incandescent bulbs were employed for this purpose. However, a variety of factors have motivated replacement of incandescent bulbs with light emitting diodes (LEDs) in such applications, including improvements in power consumption, heat generation, vibration resistance, and operating lifetime.

This leads to situations where on a given aircraft instrument panel, there is a mixture of incandescent lamps and LEDs. Since techniques for controlling illumination are different for each, this creates some challenges, and in "next generation" cockpits (aircraft designed less than 10 years ago) there may be two cockpit lamp power busses, one for incandescent lamps, the other for LED lamps, each with its own system for dimming.

One approach to satisfying the luminance standards and voltage level expectations when utilizing LEDs involves providing a mechanism for compensating for changing the portion of the applied input power which is actually transmitted to the LEDs. The portion of the applied input power which is transmitted to the LEDs changes across the operating range of input power to the LED illuminated indicator, matching the power transmitted to the LEDs to the power which is required by the LEDs to achieve approximately the same luminance as an incandescent bulb receiving the same input power. However, this approach negates at least some of the reduction in power consumption achieved by employing LEDs in lieu of incandescent bulbs.

Another approach to forcing multiple LEDs to "behave" like incandescent lamps (bulbs) for purposes of dimming (e.g, to follow the incandescent voltage/intensity curve), so that the LEDs could then be powered by an existing incandescent dimmer (DC-mode dimmer) and achieve brightness tracking, can be found in U.S. Pat. No. 6,670,776 which discloses enhanced trim resolution voltage-controlled dimming LED driver. Illumination sources, each including at least one light emitting diode, are connected either in series or in parallel by a switching circuit, depending upon an applied input voltage. The switching circuit switches the illumination sources from series- to parallel-connection, or vice versa, when the applied input voltage crosses a threshold value in traversing the operating range of applied input voltages. Because the light emitting diodes within the illumination sources are switched from series to parallel connection at a defined kickover point, the voltage-luminance characteristic changes on opposite sides of the kickover point. The resulting overall voltage-luminance characteristic has greater variability in luminance across the entire operating range of applied input voltages, and luminance-variance is not limited to only a portion of the operating range. Greater trim resolution for voltage-controlled dimming of the light emitting diode is therefore provided, with industry standard luminances being achieved at appropriate applied input voltages. This arrangement requires that the LEDs can be clustered to track the brightness curve of the equivalent incandescent lamps. These LEDs could then be powered by the existing incandescent dimmer (DC-mode dimmer) and achieve brightness tracking.

U.S. Pat. No. 5,430,356 discloses programmable lighting control system with normalized dimming for different light sources. A lighting control system is adapted to dim a plurality of groups of light sources in a room to any one of a number of different preset levels to achieve a like number of different lighting scenes. Each group of light sources defines a lighting zone of the same type of light source, for example, incandescent lamps, fluorescent lamps, neon lights, etc. The system includes a plurality of dimmers for adjusting the respective light levels of the different lighting zones, and a display panel for displaying the instantaneous light level of each zone. A suitably programmed microprocessor or the like operates to normalize the system's dimming performance for a plurality of different types of light sources so that a given change in dimmer setting produces the same change in perceived light level from each of the different types of light sources. Preferably, a system user inputs the type of light source used in each zone by a software scheme that operates the light level indicators of the display panel in an alternative mode to indicate the various types of light sources. In this patent, the intensity tracks among different kinds of lights, but each kind of light gets its own dimmer.

U.S. Pat. No. 6,559,777 discloses a lighting system wherein an infrared (LED) and an incandescent lamp cluster are powered by the same power buss. In this system, different voltage levels are transmitted to the infrared/incandescent lamp cluster. A power converter in the lamp cluster detects the voltage level and converts the power to an appropriate voltage level sends the power to one or the other of the infrared and incandescent lamps. This system has the added complexity and decreased reliability of power conversion electronics in each lamp. This function of this system is not to match the intensity of the incandescent lamp with the LED lamp; each type lamp is operated exclusively of the other. The system also requires special composite lamps.

BRIEF DESCRIPTION (SUMMARY) OF THE INVENTION

It is a general object of the invention to provide an improved technique for dimming incandescent lamps and LEDs.

It is another object to provide a technique for dimming incandescent lamps and LEDs, connected to a common power bus, in a manner that they substantially track each other in light output intensity.

According to the invention, a composite waveform is provided that has two power components: a pulse-width modulated (PWM) component and (in one embodiment) a direct current DC component. Values are selected for the two power components so that:

the LEDs are unaffected by the DC component;
the PWM component controls the light intensity of the LEDs; and
the DC component is calculated taking into account that the PWM component contributes to the light intensity of the incandescent lamps.

In this manner, two different types of lighting devices can be connected to a common lamp power bus and controlled (dimmed) in concert with one another (their output intensity tracks one another in response to a common power signal). As used herein, a lighting device is "different" than another lighting device when it responds differently to different voltages (and/or currents), particularly in terms of output light intensity—for example LEDs and incandescent lamps.

Generally, the composite waveform comprises at least two components—for example, a first component and a second component. At least one of the components (e.g., the first component which is a PWM component) is "sensed" by only one of the lighting devices (e.g., the LEDs), while the other lighting device (e.g., incandescent lamps) senses both (or all) of the components of the composite waveform. The second component can be a DC component, and can be either positive or negative (with respect to the polarity of the first component). Also, the second power component can be an AC component. The second component can also be a PWM component, at a different polarity or voltage level than the first PWM component. (This two-PWM approach may be useful in powering strings of two different types of LEDs, each having its own threshold voltage and luminosity curve.)

The composite waveform may be provided by one fast responding power supply, or by a variable voltage power supply for the DC component and a fixed voltage power supply, the output of which is PWM modulated, for the PWM component.

The DC component is maintained below the turn-on voltage for the LEDs—e.g., below 3.5 volts for white LEDs.

The PWM component is modulated at a frequency such as 400 Hz. This frequency is selected to be compatible with the normal 400 Hz AC ("mains frequency") found in aircraft.

The LEDs will "blink" (turn on and off) at the PWM modulation frequency. It is not uncommon for an aircraft to rise or descend several feet in a few tenths of a second in turbulence. A four-foot drop in 0.5 seconds is equivalent to 8 feet/second. For an object traveling at 8 feet per second, and an LED blinking at 100 Hz, the resulting dots of light would be separated by approximately 1 inch (0.96) inches, appearing as a line of dots, which would be visually unacceptable. At 400 Hz, the dots would be separated by only about a quarter of an inch, or the diameter of standard LEDs. Thus, in a situation where the LEDs are moving in a plane which is generally normal to line of sight, the PWM modulation frequency is caused to be at least sufficient to minimize the "line of dots" effect.

The waveform of the PWM component is caused to be trapezoidal, having a slope that is comparable to the slope of a 400 Hz AC signal. This helps reduce EMI (electromagnetic interference), as contrasted with a square wave. The slope, S, of the trapezoidal PWM wave is suitably set to be $S = A \times B \times 2\pi$ volts/second, where A is peak voltage (such as $115 \times \sqrt{2}$), and B is the PWM frequency (such as 400 Hz).

A small ("trickle") steady state power component of 2 mA (milliamps) is provided to keep the LEDs ever so slightly turned on. This helps reduce EMI by terminating the power lines feeding the LEDs (from the power bus).

Regarding EMI, a useful environment for the dimmer of the present invention is in aircraft, where reducing (limiting) EMI is a concern.

According to a feature of the invention, a technique is provided for autodetecting the load, whether one or more LEDs are connected to the power bus, whether one or more incandescent lamps are connected to the power bus, or whether both LEDs and incandescent lamps are connected to the power bus. Generally,

- if an incandescent lamp is connected to the power bus, a short circuit can be detected.
- if no incandescent lamp is connected to the power bus, a short circuit will not be detected.
  - this could mean either LEDs only, or no lamps whatsoever
- if only incandescent lamps are connected to the lamp power bus, when the voltage on the lamp power bus is doubled (e.g., from below the LED threshold to above the LED threshold), the current will double.
- if both incandescent lamps and LEDs are connected to the lamp power bus, when the voltage on the lamp power bus is doubled (e.g., from below the LED threshold to above the LED threshold), the current will more than double, due to the LED loads responding to the higher voltage and drawing current.

An advantage of the present invention is that two different kinds of illumination devices—LEDs and incandescent lamps—can be controlled so that their output intensity levels L will substantially track each other. In this case, "substantially" means from the subjective viewpoint of a human observer—in objective terms, within plus or minus only a few percent (e.g., +/−5%).

Another advantage of the present invention is that not only can LEDs and incandescent lamps be mixed, on the same power bus, but also different LEDs having different threshold voltages can also be mixed on the power bus.

The dimmer of the present invention is suitable for controlling light intensity of LEDs and incandescent bulbs connected to a common power bus, and comprises:

means for providing a composite signal on the power bus comprising a first component (V1) and a second component (V2), wherein:
the first component (V1) is PWM and controls the intensity (L1) of the LEDs in direct proportion to duty cycle (D), and contributes to the intensity (L2) of the incandescent bulbs; and
the second component is selected from the group comprising DC, AC and PWM, and is selected such that the second component contributes to the intensity of the incandescent bulbs and does not contribute to the intensity of the LEDs. (The LEDs do not "sense" the second component.)

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Conventional electronic components may be labeled with conventional schematic-style references comprising a letter (e.g., A, C, R) indicating the type of electronic component (e.g., amplifier, capacitor, resistor, respectively) followed by a number indicating the iteration of that element (e.g., "1" meaning a first of typically several of a given type of electronic component). Components such as resistors and capacitors typically have two terminals, which may be referred to herein as "ends". In some instances, "signals" are referred to, and reference numerals point to lines that carry said signals.

The structure, operation, and advantages of the present preferred embodiment of the invention will become further apparent upon consideration of the following description taken in conjunction with the accompanying drawings.

Figure 1:
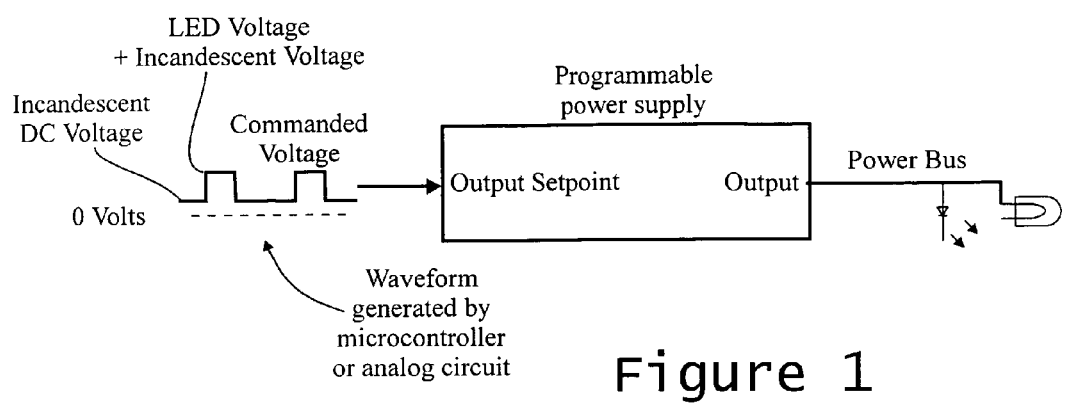

FIG. 1 is a schematic block diagram of an embodiment of the invention.

Figure 2:
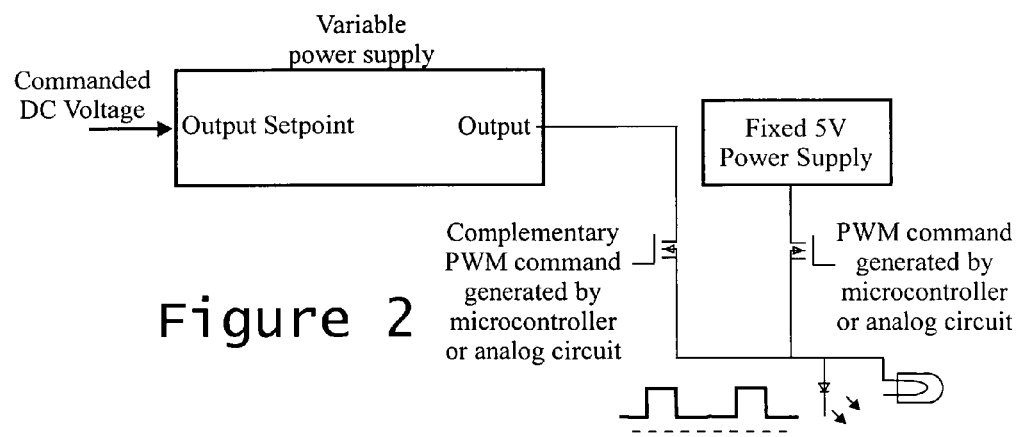

FIG. 2 is a schematic block diagram of another embodiment of the invention.

DETAILED DESCRIPTION OF THE INVENTION

The typical intensity function for an incandescent lamp is $$\frac{L_{INC1}}{L_{INC2}} = \left(\frac{V_{rms1}}{V_{rms2}}\right)^{3.4}$$

while the typical intensity function for an LED is $$\frac{L_{LED1}}{L_{LED2}} = \left(\frac{I_{AVE1}}{I_{AVE2}}\right)^{1}$$

where L is the light output.

In a typical design, the LED is operated at a full-scale current (set by the LED itself, a series resistor, and the applied DC voltage) where the intensity of the LED matches the intensity of the incandescent lamp.

Given that the applied full-scale voltage is the same, the two equations become:

$$\frac{L_{LED1}}{L_{LED2}} = \left(\frac{V_{AVE1}}{V_{AVE2}}\right)^{1}$$

$$\frac{L_{INC1}}{L_{INC2}} = \left(\frac{V_{rms1}}{V_{rms2}}\right)^{3.4}$$

In a PWM system, $V_{rms}=V_{DC}*\sqrt{D}$ and $V_{AVE}=V_{DC}*D$, where D is the duty cycle.

Thus the two transfer functions, as a function of duty cycle (denominator is assumed to be at 100% duty cycle, D=1) become:

$$L_{LED}=V_{DC} \times D$$

$$L_{INC}=V_{DC} \times (D^{0.5})^{3.4}$$

$$L_{INC}=V_{DC} \times D^{1.7}$$

The difficulty is that the lamps match intensity only at rated voltage. At any other voltage (0<D<1) the LED will be brighter than the incandescent lamp.

The present invention provides a method of creating a waveform that has two power components: one component of power affects the LED while both components affect the incandescent lamp.

The LED threshold voltage is generally chosen to be close to the supply voltage for efficiency. In contrast, if the voltage of the LED is small compared to the supply voltage (e.g., a 2.4V yellow LED running off of a 12V supply), then most of the power (12−2.4/12) is dissipated in the LED's series resistor. What is common is for white LED's @ 3.5–4 V be run from a 5 V supply, or 10 red LEDs in series (10×2.2V) running from a 28 V supply.

Incandescent lamps absorb all power coming into them; therefore they consume power at voltages lower than LEDs.

Thus to make the single source power both LEDs and incandescent lamps, the present invention provides the PWM signal for the LED and applies a DC signal that will supply the right amount of power to illuminate the incandescent lamp to the matching illumination.

For a desired light output level L (L=0–100% illumination), the LED component (V1) of the composite signal is relatively straightforward, and is based on the duty cycle D of the PWM waveform. Basically, for L=x, D=x. (Hence, D=L.) However, as explained below, calculating the appropriate power level for the DC component (V2) is somewhat more complex.

EXAMPLE 1

50% Illumination (L=0.5)

Supply voltage ($V_{MAX}$) is 5 V.
The signal powering the LEDs and incandescent lamps has two components, a pulse-width modulated (PWM) component and a DC component.
LED: D=0.5 (50%)
The 5V signal ($V_{MAX}$) is PWM modulated at D=50%.
Incandescent:

$$0.5 = \left(\frac{V_{RMS1}}{5\ V}\right)^{3.4} \text{ or } 0.816 = \left(\frac{V_{RMS1}}{5\ V}\right) \text{ or } 4.078 = V_{RMS1}$$

Therefore, 4.078 Vrms is needed for the incandescent lamp to light at 50%.

The incandescent lamp will respond to the total RMS voltage. This is also called a quadrature power solution because the applied signal is composed of two voltages at different frequencies—DC and the PWM signal. The task is thus to compute the DC voltage, present at a duty cycle of (1-D) that will produce the desired RMS voltage at the incandescent lamp.

RMS voltage of a Waveform at Vmax for D and V2 for 1-D:

$$V_{RMS} = \sqrt{\int_0^1 v^2(t)\,dt} =$$

$$\sqrt{\int_0^D V_{max}^2(t)\,dt + \int_D^1 V_2^2(t)\,dt} = \sqrt{V_{max}^2(D) + V_2^2(1-D)}$$

solving for $V_2$: $V_2 = \sqrt{\frac{(V_{RMS})^2 - V_{max}^2(D)}{(1-D)}}$ (principal root)

| | |
|---|---|
| $V_{RMS}$ = | 4.078 (total RMS Voltage required to achieve 50% illumination in incandescent lamp) |
| D = | 0.5 (Duty Cycle) |
| $V_{MAX}$ = | 5 (Supply Voltage) |
| $V_2$ = | 2.874 V (DC component) |

There is thus provided a technique for controlling LEDs and incandescent lamps connected to a common power bus in a manner that both can be dimmed in concert with one another. A power signal comprises a PWM component (V1) and a DC component (V2). The DC component is below the threshold voltage for the LEDs, therefore the PWM component (V1) of the power signal is simply controlled by the duty cycle (D×Vmax). And, the DC component (V2) is calculated according to the RMS solution set forth above.

A few more examples are provided. In each example, supply voltage ($V_{MAX}$) is 5 V.

EXAMPLE 2

90% Illumination (L=0.9)

LED: D=0.9 (90%)
Incandescent:

$$0.9 = \left(\frac{V_{RMS1}}{5\ V}\right)^{3.4} \text{ or } 0.969 = \left(\frac{V_{RMS1}}{5\ V}\right) \text{ or } 4.847 = V_{RMS1}$$

$V_{RMS}$=4.847
D=0.9
$V_{MAX}$=5
$V_2$=3.159 V

EXAMPLE 3

10% Illumination (L=0.10)

LED: D=0.1 (10%)
Incandescent:

$$0.1 = \left(\frac{V_{RMS1}}{5\ V}\right)^{3.4} \text{ or } 0.508 = \left(\frac{V_{RMS1}}{5\ V}\right) \text{ or } 2.540 = V_{RMS1}$$

$V_{RMS}$=2.54
D=0.1
$V_{MAX}$=5
$V_2$=2.096 V

EXAMPLE 4

1% Illumination (L=0.01)

LED: D=0.01 (1%)
Incandescent:

$$0.01 = \left(\frac{V_{RMS1}}{5\ V}\right)^{3.4} \text{ or } 0.258 = \left(\frac{V_{RMS1}}{5\ V}\right) \text{ or } 1.290 = V_{RMS1}$$

$V_{RMS}$=1.290
D=0.01
$V_{MAX}$=5
$V_2$=1.196 V

EXAMPLE 5

99% Illumination (L=0.99)

LED: D=0.99 (99%)
Incandescent:

$$0.99 = \left(\frac{V_{RMS1}}{5\ V}\right)^{3.4} \text{ or } 0.997 = \left(\frac{V_{RMS1}}{5\ V}\right) \text{ or } 4.985 = V_{RMS1}$$

$V_{RMS}$=4.985
D=0.99
$V_{MAX}$=5
$V_2$=0.322 V

It can be noted that the applied DC voltage (in these selected examples) does not exceed the LED turn-on threshold (3.5–4 V), so there is no distortion of the LED lighting.

As discussed above, for incandescent lamps the amount of light produced is proportional to the $3.4^{th}$ power of the ratio of the RMS (Root-Mean-Square) voltages. For lamps for which the 3.4 power is different or even definable by a table instead of an algebraic equation, corresponding equations and solutions could easily be derived by one having ordinary skill in the art to which the present invention most nearly pertains, based on the teachings set forth herein.

It is within the scope of the invention that the RMS solution could be the negative root instead of the principal (positive) root. If the negative root were used, the DC voltage would be –2.874 V instead of +2.874V for the 50% illumination example previously developed. The incandescent lamp would be subjected to an alternating voltage instead of varying amounts of positive voltage.

It is well-known that lamps operating at DC suffer reduced life due to a phenomenon called "filament notching" which is caused by migration of the tungsten toward the negative electrode. The alternating voltage (for V2) thus would tend to relieve some of the migration and reduce the propensity to notching.

A further advantage of a negative DC bus voltage is that the LEDs do not light when a reverse bias is applied. Thus if the LED threshold voltage is relatively low, the dimmer will prevent false illumination of the LEDs when the DC voltage is high. For example, suppose the LED threshold voltage is 2.4V (single green led operating from 5V). The previously computed 2.874 V (50% illumination point) would cause the LED to illuminate during the "off" 50% portion, so the LED illumination would be more than expected and the LED/incandescent intensity matching would not be maintained. By applying –2.874 V instead of +2.874 V in the DC portion, the previously derived equations would be accurate and matching would be maintained.

Hardware Implementation

Generally, a composite power signal is provided on a lamp power bus to which the LEDs and the incandescent lamps are connected.

FIG. 1 shows an embodiment wherein a signal indicative of V1 (PWM component) and V2 (DC component) is provided to an output setpoint input of a programmable power supply. The output of the power supply is the composite power signal which is V1+V2. In this embodiment, the power supply must be a fast responding power supply since it must command different voltages at the PWM rate (e.g., 400 Hz). Such fast-responding power supplies are known. They are commonly used on computer motherboards, for example. In this manner, the intensity of a plurality of (one or more) LEDs (represented by a single LED in the figure) and a plurality of incandescent lamps (represented by a single incandescent lamp in the figure) can be controlled.

FIG. 2 shows an embodiment wherein two power supplies are used: (i) a variable power supply which need not be fast responding (as in the previous embodiment), and (ii) a fixed 5V (e.g., for white LEDs) power supply.

The output setpoint of the variable power supply is set to the DC voltage (V2), as calculated above. (DC Voltage commanded by microcontroller or analog circuit.) The output of the variable power supply is provided through a first solid state switching device, such as a FET switch, to the power bus. The output of the fixed power supply is provided through a second FET switch to the power bus.

A PWM command is generated by a controller (not shown) which may be a microcontroller or an analog circuit, according to the techniques discussed above, and controls conductivity of the first FET switch. A complementary PWM command, which is the inverse of the PWM command, is generated by the microcontroller, and controls conductivity of the second FET switch. The controller causes switching between the outputs of the two power supplies at the PWM rate to generate the two voltage levels at the load.

EMI Reduction

Because an LED is essentially open-circuit if it has less than two volts across it, the wires going to the LED light strips act like antennas for small differential-mode noise. (Incandescent lamps do not have this problem, because the lamps always present a low resistance.) A fixed 2 mA current (small trickle current) is provided on the lamp power bus to ensure that the LEDs are slightly turned on (biased into their low-resistance region). This reduced the impedance of the LEDs, and at 2 mA, they will not emit noticeable light. But this helps reduce EMI by terminating the power lines feeding the otherwise open-circuit LEDs. This steady state current can simply be provided by a resistor (e.g., 13 k-ohm) tied to the power supply input (e.g., 28 VDC), acting as a current source. This current source is also useful for lamp detection, discussed below.

The power supply (i.e., the overall dimmer) may have multiple (n) output channels for corresponding multiple lamp power busses, and the power busses (hence, the lamps connected to the respective power bus) can be controlled independently (independent duty cycles, D1, D2 ... Dn, and corresponding incandescent DC voltages). In the case of multiple (n) output channels, the phases of the PWM components on the output channels are phased 360/n degrees apart, to reduce EMI. Two output channels are phased 180 degrees apart, three channels are phased 120 degrees apart, four channels are phased 90 degrees apart.

Preferably, the PWM modulation technique being employed is "double-edged" modulation. Double-edged modulation is more complex and harder to implement than single-edged modulation but double-edged modulation reduces EMI emissions and improves the life of the power supply unit by reducing internal stresses on the input capacitors.

The outputs of the dimmer are slew-rate controlled to give edges that rise at same rate as a 115 V 400 Hz waveform (about 400 V/µs). This means the emitted EMI has the same characteristics as 400 Hz and the noise produced by the dimmer will not be intrusive. In other words, the waveform of the PWM component is trapezoidal, having a slope which is comparable to the slope of a 400 Hz AC signal. This helps reduce EMI (electromagnetic interference), as contrasted with a square wave. The slope, S, of the trapezoidal PWM wave is suitably set to be S=A×B×2pi volts/second, where A is peak voltage (such as 115×root 2), and B is the PWM frequency (such as 400 Hz).

LED/Incandescent Detection

As discussed above, a trickle current (2 mA) is provided on the power bus. In the absence of other power components, the 2 mA drives into the load. The 2 mA current produces different effects in different loads.

Incandescent loads are resistive in nature. If the load draws 10 A with 5 V applied, its resistance is 5 V/10 A=0.5 Ω(ohm). The 2 mA will produce a small voltage: 2 mA×0.5 Ω (ohm)=10 mV.

Light Emitting Diode (LED) loads are non linear. It takes 2 to 4 V to light an LED, depending on color. Red LEDs take about 2 V, green and yellow LEDs take about 2.4 V, blue LEDs take 3 V, and white LEDs take about 4 V to illuminate. Above the turn-on voltage, the LEDs conduct current very easily, so a resistor is used to limit the current. Thus, the 2 mA current will produce a voltage of 2–4 V.

The voltage may be monitored during the off time to determine if the load is incandescent lamps or LED lamps. Basically, if the load is an incandescent lamp, the voltage across the lamp will be nearly 0. If the load is 2–3V, the load is an LED lamp.

Alternatively, a current sensing means (typically a resistor developing a voltage drop) could be provided that detects the instantaneous magnitude of the current. The current could be measured when the DC voltage is applied; the ratio of DC voltage to DC current is the resistance of the incandescent load. The current could be also measured when the PWM voltage is applied; the ratio of PWM voltage to PWM current is the resistance of the incandescent plus LED load. From these two resistances, the relative magnitudes of LED and incandescent loads may be computed.

An advantage of the present invention is that it can operate LED lamps or incandescent lamps and maintain equivalent light output for each type.

One having ordinary skill in the art to which the present invention most nearly pertains will appreciate that several other features could be incorporated into the dimmer, such as:

input current limiting;
output current limiting; and
soft start feature to reduce lamp stress (to allow the filaments of incandescent lamps to heat up before increased power is applied)

Alternating Current System

The invention has been described, hereinabove, as a two-level DC system—the incandescent lamps being powered by a variable DC voltage below the threshold voltage of the LEDs, and the LEDs being powered by a fixed DC voltage which is higher than the threshold voltage and which is pulse width modulated. It is within the scope of the invention that the incandescent lamps are powered by an AC voltage. The same principles as outlined above would apply, and certain other advantages may accrue. For example, whereas the incandescent lamps will respond to an entire AC cycle, the LEDs will not respond to the negative (reverse bias) part of the AC cycle. Thus, the composite waveform on the power bus can comprise two power components: a pulse-width-modulated (PWM) component (V1) having a duty cycle (D) and an alternating current AC component (V2). This could include the AC component being full wave rectified to the opposite polarity from the PWM component.

Certain jet transport aircraft have a variable AC voltage for the incandescent dimming buss. The invention described here could be modified to produce a PWM signal only that would be added to the variable AC voltage to support LED loads on the incandescent buss. In that variation of the dimmer, the dimmer would measure the AC voltage to get the pilot's illumination setpoint and create a PWM signal to make a composite power waveform. The composite waveform would have the characteristics previously described: the LED lamps would respond only to certain elements of the waveform and the incandescent lamps would respond to all the elements of the composite waveform.

Dual PWM System

The invention described here could also be implemented with two PWM signals generating the composite waveform, instead of one PWM signal plus a DC voltage. The basic principle remains the same: that one load responds to some elements of the composite waveform and the other load responds to some components of the composite waveform. As long as the one load is sensitive to at least one element to which the other load is not responsive, both loads can be controlled with a single composite waveform. The second PWM component could be of the same polarity or of opposite polarity as the first PWM component. If the same polarity, the threshold issues discussed above (one type of device does not "sense" the second component) apply.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected.

What is claimed is:

1. Method of dimming both incandescent lamps and LEDs connected to a common lamp power bus, comprising:
   connecting incandescent lamps to the power bus;
   connecting LEDs to the power bus;
   with a composite waveform on the power bus, causing light output intensities of the incandescent lamps and of the LEDs to track each other, when being dimmed;
   wherein:
   the composite waveform comprises two power components: a pulse-width modulated (PWM) component (V1) having a duty cycle (D) and an alternating current (AC) component (V2).

2. Method, according to claim 1, wherein:
   the composite waveform is provided by one fast responding power supply.

3. Method, according to claim 1, wherein:
   the PWM component is modulated at a frequency which is compatible with alternating current (AC) power frequencies found in an environment of the dimmer.

4. Method, according to claim 1, further comprising:
   autodetecting whether one or more LEDs are connected to the power bus, whether one or more incandescent lamps are connected to the power bus, or whether both LEDs and incandescent lamps are connected to the power bus.

5. Method, according to claim 1, wherein multiple (n) output channels are provided for corresponding multiple lamp power busses, further comprising:
   phasing the PWM components of the output channels 360/n degrees apart to reduce EMI.

6. Method of dimming both incandescent lamps and LEDs connected to a common lamp power bus, comprising:

connecting incandescent lamps to the power bus;
connecting LEDs to the power bus;
with a composite waveform on the power bus, causing light output intensities of the incandescent lamps and of the LEDs to track each other, when being dimmed;
wherein:
the composite waveform comprises two power components: a first pulse-width modulated (PWM) component (V1) and a second pulse-width modulated (PWM) component (V2).

7. Method, according to claim 6, wherein:
the second PWM component is of opposite polarity as the first PWM component.

8. Method, according to claim 6, wherein:
the composite waveform is provided by one fast responding power supply.

9. Method, according to claim 6, further comprising:
autodetecting whether one or more LEDs are connected to the power bus, whether one or more incandescent lamps are connected to the power bus, or whether both LEDs and incandescent lamps are connected to the power bus.

10. Method of dimming both incandescent lamps and LEDs connected to a common lamp power bus, comprising:
connecting incandescent lamps to the power bus;
connecting LEDs to the power bus;
with a composite waveform on the power bus, causing light output intensities of the incandescent lamps and of the LEDs to track each other, when being dimmed;
wherein:
the composite waveform comprises two power components: a pulse-width modulated (PWM) component (V1) having a duty cycle (D) and a direct current (DC) component (V2).

11. Method, according to claim 10, wherein:
the DC component is negative within respect to the PWM component.

12. Method, according to claim 10, further comprising:
selecting values for the two power components so that:
the LEDs are unaffected by the DC component;
the PWM component controls the light intensity of the LEDs; and
the DC component is calculated taking into account that the PWM component contributes to the light intensity of the incandescent lamps.

13. Method, according to claim 10, wherein:
the composite waveform is provided by one fast responding power supply.

14. Method, according to claim 10, wherein:
the composite waveform is provided by a variable voltage power supply for the DC component and a fixed voltage power supply the output of which is PWM modulated, for the PWM component.

15. Method, according to claim 10, wherein:
the PWM component is modulated at a frequency which is compatible with alternating current (AC) power frequencies found in environment of the dimmer.

16. Method, according to claim 10, wherein:
the PWM component is modulated at the mains frequency.

17. Method, according to claim 10, wherein:
a waveform of the PWM component is slew-rate controlled to give edges that rise at rate which is comparable with a slew rate for alternating current (AC) power frequencies found in the dimmer environment.

18. Method, according to claim 10, wherein:
a waveform of the PWM component is modulated using a "double-edged" modulation technique.

19. Method, according to claim 10, further comprising:
providing a steady state power component to keep the LEDs slightly turned on.

20. Method, according to claim 6, further comprising:
autodetecting whether one or more LEDs are connected to the power bus, whether one or more incandescent lamps are connected to the power bus, or whether both LEDs and incandescent lamps are connected to the power bus.

21. Method, according to claim 20, wherein:
autodetection is performed by monitoring the power bus during the off time of the PWM component.

22. Method, according to claim 10, wherein multiple (n) output channels are provided for corresponding multiple lamp power busses, further comprising:
phasing the PWM components of the output channels 360/n degrees apart to reduce EMI.

23. Method, according to claim 10, further comprising:
for a given desired output level (L), calculating the PWM component (V1) according to duty cycle (D), and computing the DC component (V2) as a quadrature power solution.

24. Method according to claim 10, further comprising:
for a given desired output level (L), calculating the PWM component (V1) according to duty cycle (D), and computing the DC component (V2) according to:

$$V_2 = \sqrt{\frac{(V_{\text{RMS}})^2 - V_{\text{max}}^2(D)}{(1-D)}}$$

wherein:
VRMS =RMS voltage required in the incandescent lamp to meet the desired illumination level
D=the Duty Cycle
VMAX=Supply Voltage.

25. Dimmer for controlling light intensity of LEDs and incandescent bulbs connected to a common power bus comprising:
a common power bus to which the LEDs and incandescent bulbs are connected;
means for providing a composite signal on the power bus comprising a first component (V1) and a second component (V2), wherein:
the first component is PWM and controls the intensity (L) of the LEDs in direct proportion to the PWM duty cycle (D), and contributes to the intensity of the incandescent bulbs; and
the second component is selected from the group comprising DC, AC and PWM, and is selected such that the second component contributes to the intensity of the incandescent bulbs and does not contribute to the intensity of the LEDs.

* * * * *